United States Patent Office 3,519,588
Patented July 7, 1970

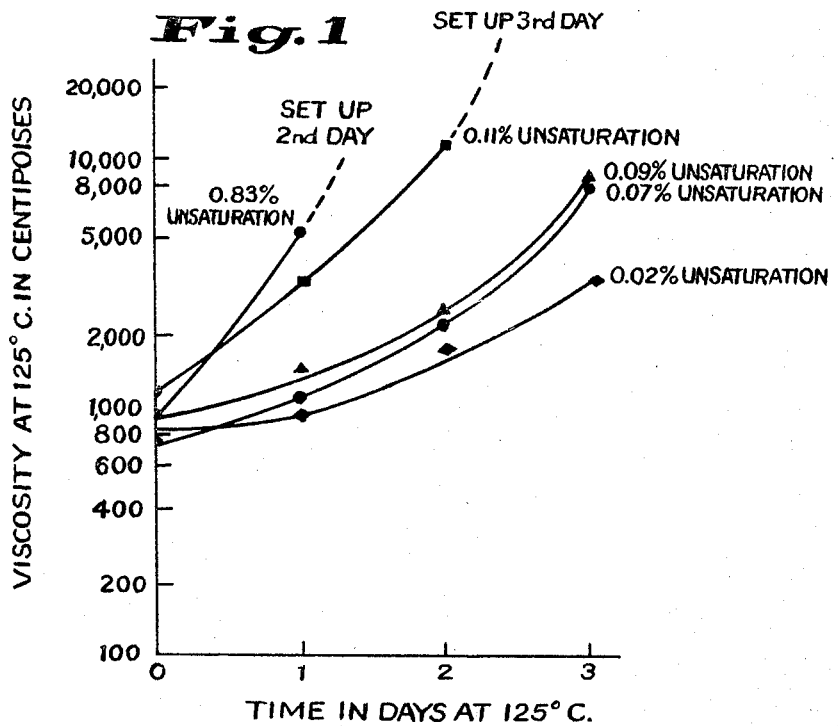
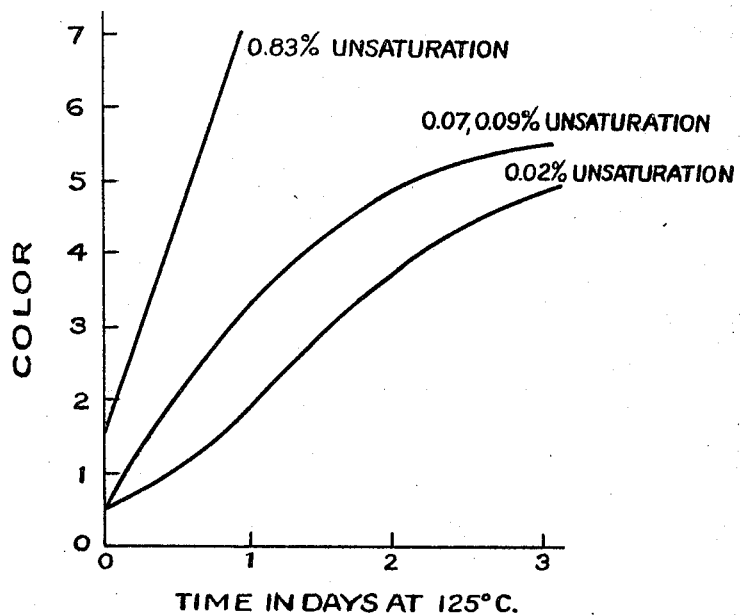

3,519,588
EMULSIFIABLE WAXES FROM POLYOLEFINS
Hugh J. Hagemeyer, Jr., and Raymond L. Etter, Jr., Longview, Tex., assignors to Eastman Kodak Company, Rochester, N.Y., a corporation of New Jersey
Filed Mar. 8, 1963, Ser. No. 263,792
Int. Cl. C08d 5/00
U.S. Cl. 260—29.6      18 Claims

ABSTRACT OF THE DISCLOSURE

Emulsifiable polyolefin waxes, particular polyethylene waxes, having improved properties are produced by thermally degrading the polyolefin in an inert atmosphere to form a low molecular weight, unsaturated product which is then hydrogenated prior to oxidation.

---

This invention relates to a novel process for producing polymers of exceptional color and viscosity stability and to the polymers thus produced. In a specific aspect this invention relates to a novel process for perparing emulsifiable polyolefin waxes, particularly polyethylene waxes, of improved stability, odor, color, toughness and hardness and to the emulsifiable waxes thus produced.

The commercial production of solid high molecular weight polyethylene was initially limited to high pressure procedures such as those disclosed by Fawcett et al. in U.S. 2,153,553 wherein it is disclosed that ethylene can be polymerized to form a solid waxy polymer at pressures in excess of 500 atmospheres and usually within the range of 1,000 to 2,000 atmospheres. Polyethylene produced in such high pressure processes has been characterized by high flexibility, good film-forming properties, and a waxy appearance. These high pressure polymerization procedures produce a polyethylene that possesses a high degree of chain branching and the polymer exhibits a relatively low softening temperature, a low density and a relatively low crystallinity.

Recently it has been found that polyethylene, polypropylene, ethylene-propylene copolymers, polyallomer, and polymers and copolymers of higher molecular weight olefins can be produced by polymerizing the appropriate monomer or monomers at considerably lower temperatures and in the presence of certain catalysts. For example, in U.S. 2,691,647 it is disclosed that ethylene can be polymerized in the presence of a catalytic mixture consisting of a supported oxide of chromium, molybdenum, tungsten, or uranium activated by an alkali metal. Similarly, U.S. 2,699,457 discloses that polyethylene can be polymerized in the presence of a catalytic mixture of a metal alkyl or metal alkyl halide such as aluminum triethyl or ethyl aluminum chloride in combination with a compound of a metal from the fourth to the sixth subgroups of the Periodic Table. Also, in more recent years it has been found that an outstanding type of polyethylene can be produced by polymerizing ethylene in the presence of a catalytic mixture consisting of a metal, such as aluminum, and a titanium tetrahalide. The above procedures for producing olefin polymers are characterized by the use of comparatively low pressures and the polymers produced in accordance with these low pressure procedures possess a high density, high crystallinity, improved melting point and increased softening temperature and a relatively greater rigidity than polymer produced by the high pressure procedures.

It is known that polyethylene produced by either a high-pressure or a low-pressure process can be degraded thermally to produce a product of substantially lower molecular weight. In fact, a thermal degradation process can be used to produce certain types of polyethylene waxes from higher molecular weight polymers. The thermal degradation of polyethylene is frequently carried out in an inert atmosphere, such as under a nitrogen blanket, to prevent the oxidation of the degraded polymer. We have found that degraded polyethylene prepared by prior art procedures possesses a high degree of unsaturation, and as a result, the degraded polymer exhibits poor oxidation and weathering stability, and the degraded product has an undesirable odor. Also, the prior art degraded product can undergo undesirable side reactions which lead to the formation of branched molecules of decreased crystallinity and melting point.

It is also known that thermally degraded polyethylene can be oxidized to produce a completely emulsifiable wax, and for many purposes these emulsifiable waxes have been found to be quite useful in commercial applications. However, for certain purposes these emulsifiable waxes do not possess the required color and viscosity stability for the intended uses.

It is an object of this invention to provide a novel process for producing novel polymers of exceptional color and viscosity stability. It is another object of this invention to provide novel emulsifiable waxes of exceptional color and viscosity stability from polyolefins. It is a further object of this invention to provide a novel process for treating polyethylene to form an emulsifiable wax of improved viscosity stability, odor, color, toughness, and hardness. Further and additional objects of this invention will be quite apparent from the detailed description appearing below.

In accordance with this invention, it has been found that polyolefins, particularly polyethylene, can be treated to produce emulsifiable products of outstanding and unexpected color and viscosity stability by thermally degrading said polyolefins to form a lower molecular weight, more unsaturated product, hydrogenating the thermally degraded product to substantially decrease the amount of unsaturation and oxidizing the hydrogenated product to form a novel emulsifiable product.

In practicing our invention any solid high molecular weight polyolefin can be used; for example, polyethylene, polypropylene, polybutene, polyallomer, and the like. These polyolefins can be homopolymers or copolymers of the various olefinic monomers. Our invention is particularly applicable for the production of emulsifiable waxes from polyethylene, and the invention will be described in detail with specific reference to polyethylene. However, it should be understood that our novel process can be used for the production of novel products from any of the solid high molecular weight polyhydrocarbons.

Polyethylene employed in our degradation process can be produced by any of the so-called high-pressure and low-pressure processes. The polyethylene should have a molecular weight in excess of about 5,000 and preferably in excess of about 10,000 and a density within the range of 0.90 to 0.98 and higher. The polyethylene can be produced by polymerizing ethylene in the presence of any of the known peroxide catalysts and pressures of 500 atmospheres and higher. A suitable procedure for producing high-pressure polyethylene is included in U.S. 2,153,553.

Polyethylene as well as other polyhydrocarbons for our process can also be formed by any of the so-called low-pressure procedures. In carrying out a low-pressure polymerization reaction any of the known catalysts for such reactions can be used. Among the catalysts that can be employed are the aluminum trialkyl type of catalysts. For example, aluminum triethyl admixed with a titanium tetrahalide, such as titanium tetrachloride, or an aluminum triethyl admixed with a vanadium halide, such as vanadium trichloride, can be used. Another satisfactory catalyst mixture for producing polyethylene in the first step of our process comprises a mixture of sodium amyl and titanium tetrachloride. Also, the metal oxide types of catalyst can be used to prepare polymers for this invention. For example, catalysts comprising chromium oxide, and silicon oxide deposited on an activated alumina can be used as well as molybdenum oxide deposited upon an activated form of alumina. It is also possible to use a catalyst mixture comprising vanadium pentoxide deposited on activated alumina.

By way of example, a highly crystalline, high density polyethylene can be formed in a low-pressure process using a catalyst mixture comprising aluminum and titanium tetrachloride to carry out the polymerization reactions. In this process the polymerization reaction is generally carried out in liquid phase in an inert organic liquid, preferably an inert liquid hydrocarbon. The reaction proceeds over a relatively wide temperature range with temperatures of 20 to 200° C. being preferably employed and particularly good results can be obtained at a temperature within the range of 40 to 160° C. The reaction pressure varies from atmospheric pressure to a pressure of about 1000 p.s.i.g., although in some instances, considerably higher pressures can be used if they are considered necessary. The inert organic liquid desirably serves as a liquid medium and a solvent for the solid polyethylene at the temperature of polymerization. The great increase in polymerization rate with increasing pressures makes the use of pressures of 300 to 500 p.s.i.g. quite desirable.

Polyethylene produced by low-pressure procedures can be highly crystalline, and it usually exhibits a crystallinity of at least 80% as shown by X-ray diagrams. Ordinarily, the crystallinities of the polyethylene produced in the low-pressure processes average about 90% and higher.

In our process the polyolefin, for example polyethylene, is thermally degraded by heating the polymer for a satisfactory period of time to effect the desired reduction in molecular weight. Generally, the thermal degradation temperature does not exceed 400° C., and usually the temperature is within the range of 200 to 400° C. The thermal degradation time can vary considerably depending upon the degree of unsaturation and reduction in molecular weight desired. For example, the thermal degradation time can vary from about 10 seconds up to about 2 hours. In some instances, it may be desirable or necessary to heat the polymer for as much as 10 hours and more depending on the other conditions and the type of product desired. Normally, the degradation time and temperature are varied to obtain the desired viscosity range of the degraded product and the time-temperature combination is selected to yield the maximum rate of desired product at the most economical reaction conditions.

The thermal degradation is carried out in an inert atmosphere and in the substantial absence of reactive gases, such as oxygen, hydrogen and the like. Inert gases, such as nitrogen, argon, helium, and the like, can be used to blanket the polymer during the thermal degradation reaction.

The thermal degradation can be carried out either batchwise or in a continuous process. In a batch system a stirred vessel containing an inert gas, such as nitrogen, is charged with the polymer to be degraded and the polymer is heated to the desired temperature with adequate agitation and held at that temperature for a specific period of time. Any low boiling products of the thermal degradation reaction can be removed by gas stripping or vacuum stripping of the product. In a continuous system of operation a heated tube or pipe is fed with the polymer to be degraded by an extruder or similar feeding mechanism. The rate of flow and temperature of the heated tube are controlled to give the desired viscosity of the degraded material. The degraded polymer is then gas stripped of low boiling products or vacuum stripped by means of a brush still or other similar vacuum stripping means.

The products of the thermal degradation reaction will vary in molecular weight depending upon the molecular weight of the starting material and upon the reaction conditions employed. When an emulsifiable wax is desired as the product of our process the thermally degraded product will usually have a molecular weight within the range of 1,000 to 5,000 although in some instances the molecular weight can be somewhat higher. When a plastic grade product is desired the molecular weight of the thermally degraded product can be as high as 10,000 and within the range of 10,000 to 50,000 and higher.

In our process the thermally degraded product is contacted with hydrogen in order to reduce substantially the degree of unsaturation of the thermally degraded product. The hydrogenation reaction can be carried out by use of a slurry or fixed bed process and the reaction can be conducted with or without a diluent for the degraded polymer. When a product having a molecular weight within the wax range is desired, for example a molecular weight of 1,000 to 5,000, the hydrogenation reaction can be readily carried out without a diluent or solvent since waxes are relatively easy to handle in the molten state. However, suitable paraffinic hydrocarbon diluents or solvents can be used if they are desired. The hydrogenation reaction can be carried out using suitable hydrogenation catalysts, for example, Raney nickel, nickel deposited on kieselguhr, nickel deposited on carbon or alumina, palladium deposited on carbon or alumina, sponge nickel, zirconium promoted nickel catalysts, and the like. During the hydrogenation reaction, hydrogen pressures varying from atmospheric up to 6,000 p.s.i.g. and higher can be used. Preferably, the hydrogen pressure is within the range of 50–2000 p.s.i.g. The hydrogenation temperature can vary from 100° C. up to 400° C. and higher and preferably the temperature is within the range of 150 to 350° C. It has been found to be quite effective during the reduction with hydrogen to maintain a positive flow of hydrogen through the reactor. A much more effective hydrogenation is accomplished in this manner than in a reaction vessel wherein a positive pressure of hydrogen is maintained.

When a slurry process is employed for the hydrogenation reaction the thermally degraded product which may be in the form of a wax is melted and mixed thoroughly with the catalyst preferably in a finely divided or powdery form. The resulting mixture can be agitated in a reaction vessel under hydrogen pressure or the mixture can be pumped through a pipe or other elongated reaction vessel with hydrogen introduced to the reactor near the point of entrance of the catalyst-containing mixture. The hydrogenation reaction proceeds for a period of time varying from about one-half hour up to 4 hours and higher, and the resulting slurry is filtered to remove catalyst. The hydrogenated product is in molten form and ready for oxidation. If desired, it can be pelleted or otherwise placed into a discrete particulate form for subsequent oxidation.

When a fixed bed process is used for the hydrogenation reaction a heated pipe or other elongated reaction vessel is packed with pellets or granules of catalyst and the product of the thermal degradation reaction is pumped through the catalyst bed. Hydrogen is also passed through the catalyst bed, preferably concurrently with the polymer to be hydrogenated. To improve the efficiency of the hydrogenation reaction a recycle of polymer through the bed can be used and subsequently the polymer can be passed through a separate finishing packed bed. The hydrogenated polymer from the fixed bed is substantially free of catalyst but the product can be filtered to remove any traces of catalyst. The resulting product can then be processed in the same manner as the product from a slurry process.

The degraded and hydrogenated polymer is then oxidized with oxygen or an oxygen-containing gas, usually air, to obtain the desired product. When waxes are produced in our process the product wax is completely emulsifiable. For the oxidation reaction gas pressures of oxidizing gas varying from atmospheric to 1,000 p.s.i. and higher can be used. The preferred pressure range varies from 50–500 p.s.i. The oxidation temperature is usually within the range of 100–225° C. and preferably within the range of 120–160° C. Usually, no catalysts are required for the oxidation reaction, but if desired, any suitable oxidation catalyst can be used. During the oxidation reaction, substantially no cross-linking of the polymer chains takes place in our process. The contact times for the oxidation reaction vary with the temperature and pressure that have been selected for the reaction, and in most instances the contact time is within the range of one-half to 8 hours. The resulting product has an acid number between 4 and 30, preferably between 12 and 18, and the oxidized product can be degassed by vacuum or other suitable means for removal of entrained oxidizing gas. The product can then be pelleted, for example by extrusion of strands of the product into water, followed by cutting with a conventional pelletizer and subsequently dried and packaged.

Emulsifiable waxes have in the past been prepared by thermally degrading ethylene polymers and then oxidizing the thermally degraded product without prior hydrogenation. These prior art waxes have found a number of uses commercially, particularly where readily emulsifiable waxes have been required. Our product is superior to these prior art waxes in color and melt stability and the superiority of our product is shown by the comparison of the prior art type of product with our product that appears in the following table:

TABLE I

| Days | Viscosity at 125° C. and color (—) after heating at 125° C. for— | | | |
|---|---|---|---|---|
| | 0 | 1 | 2 | 3 |
| Oxidized unsaturated wax | 1,200 (1–2) | 6,200 (7) | Set up | |
| Oxidized hydrogenated wax | 1,200 (1–) | 1,520 (2) | 1,980 (3) | 3,100 (4) |

Our oxidized hydrogenated wax, which had been heated for three days, could be used to form an excellent emulsion, but the prior art type of wax, after only two days of heating, could not be used for this same purpose.

The above Table I illustrates the excellent color and viscosity stability that can be obtained when a high viscosity type of emulsifiable wax is made in accordance with our invention. The prior art oxidized but unhydrogenated waxes of relatively low viscosity have been known to be relatively stable waxes. However, the color stability of these low viscosity waxes presented problems to prior art workers. In the following table we have compared a lower viscosity type of prior art oxidized but unhydrogenated emulsifiable wax, which had been prepared from a degraded polyethylene, with a product of our invention having a comparable viscosity.

TABLE II

| Days | Viscosity at 125° C. and (color), after heating at 125° C. for— | | | |
|---|---|---|---|---|
| | 0 | 1 | 2 | 3 |
| Low viscosity wax (prepared from unsaturated material) | 190 (2) | 320 (7) | 450 (8) | 570 (8) |
| Low viscosity wax prepared from hydrogenated material | 190 (1–) | 190 (2) | 210 (4) | 220 (5) |

Our product, after three days of heating, was emulsifiable and it yielded a good emulsion. On the other hand, the prior art type of product, after three days of heating, could be emulsified but the emulsion was very poor.

In the past, it has been known that acids, such as stearic acid, could be added to a thermally degraded polyethylene prior to oxidation in order to improve the stability of the wax. The presence of the stearic acid results in the production of an oxidation product that has good viscosity stability but the stearic acid does not cause any substantial improvement in the color stability of the oxidation product. The following table contains a comparison of the viscosity and color stability of a product prepared by thermally degrading polyethylene and adding stearic acid to the degraded product prior to oxidation with a product of our invention having a similar viscosity:

TABLE III

| Days | Viscosity at 125° C. and (color) after heating at 125° C. for— | | | |
|---|---|---|---|---|
| | 0 | 1 | 2 | 3 |
| 0.8% stearic acid added before oxidation of unsaturated feed | 940 (1) | 2,320 (7) | 5,000 (7) | 6,600 (8) |
| Oxidized hydrogenated feed | 940 (1–) | 1,160 (2) | 1,960 (4) | 3,300 (5) |

The above tables illustrate the superiority of our product when compared with the non-hydrogenated oxidized thermally degraded polymers prepared by prior art procedures. We have also compared the properties of a polyethylene wax made by oxidizing a polyethylene made directly in the polymerization reactor without any thermal degradation. A polymer of this type contains a relatively low amount of unsaturation, and it can be oxidized to form a stable wax. However, the wax is very soft and often quite tacky. The color and melt stability as well as other properties of this type of polymer are compared in the following table with a product of similar viscosity prepared in accordance with our invention:

TABLE IV

| | Viscosity at 125° C. and (color) after heating at 125° C. for— | | | | Softening point, °C. | Penetration | Physical appearance |
|---|---|---|---|---|---|---|---|
| | Days | | | | | | |
| | 0 | 1 | 2 | 3 | | | |
| Oxidized polyethylene made directly to 900 cps. | 900 (1) | 1,100 (3) | 2,360 (4) | 3,800 (4) | 95 | 14 | Soft, tacky. |
| Oxidized hydrogenated thermally degraded polymer. | 910 (1–) | 1,160 (2) | 1,960 (4) | 3,300 (5) | 107 | 1.5 | Hard, brittle. |

The various physical properties of our novel product can be determined as follows:

(1) Melt Index—ASTM D1238–57T
(2) Density—ASTM D1505–57T
(3) Softening point (ring and ball) ASTM D36–26
(4) Penetration hardness—ASTM D5–52
(5) Color—Gardner scale
(6) Viscosity—Brookfield viscosity at 125° C.
(7) Molecular weight—The Staudinger System of determining molecular weights is intended when reference is made to molecular weights herein. More particularly, the molecular weights of the polymers are calculated from inherent viscosity of a dilute solution of a polyethylene. The viscosity of a dilute solution of polyethylene has been shown to be related to the known average molecular weight, $<M_N>$ according to the following formula:

$$(\eta) = 2.21 \times 10^{-3} (<M_N>)^{0.60}$$

The inherent viscosity ($\eta$) is determined using a 0.25% Tetralin solution of the polymer at 100° C.

$$(\eta) = \frac{Ln\eta r}{C}$$

wherein $$\eta r = \frac{\text{Flow time of solution}}{\text{Flow time of solvent}}$$

The concentration in grams per 100 ml. is denoted by C.

(8) Emulsifiability—The emulsifiability of a polyethylene wax can be conveniently evaluated by the procedure described hereinbelow. This procedure is used to evaluate the emulsifiability of the polyethylene waxes in the following examples.

Add 40 g. of emulsifiable polyethylene wax and 8 ml. of oleic acid to a porcelain casserole. Melt the blend on a hot plate while maintaining a temperature of 120–125° C. Add 7 ml. of 2-amino-2-methyl-1-propanol (or morpholine) slowly to the stirred mixture. Stir the melt for three minutes and then pour it into 200 ml. of hot water (99° C.) which is agitated by means of a mechanical stirrer. The wax is poured into the top of the vortex in such a manner that it does not touch the agitator or the container walls. The agitation is continued until the emulsion has cooled to below 50° C. The emulsion is rated as follows:

Good, pass—Clear or translucent, stable
Borderline—Slightly milky, stable
Fail—Milky, stable (9) Percent Unsaturation—A sample of the polymer to be tested is molded into a uniform button (or smear) and thickness determined accurately. The infrared spectrum is then determined on this sample. Absorption/cm. are calculated for 3 different bands by measuring the absorption on the chart and dividing by the thickness of the sample button. The frequencies are:

Internal unsaturation—10.35$\mu$
Vinyl unsaturation—11.00$\mu$
Vinylidene unsaturation—11.25$\mu$ The percent unsaturation (as weight percent C=C) is calculated by the following equations:

Wt. percent C=C (Internal)=0.0281×A./cm. at 10.35$\mu$
Wt. percent C=C (Vinyl)=0.0193×A./cm. at 11.00$\mu$
Wt. percent C=C (Vinylidene)=0.0231×A./cm. at 11.25$\mu$ The total unsaturation is the sum of the above three types of unsaturation.

(10) Grit—"Grit" is evidenced by solid particles in an emulsion and can be conveniently evaluated by coating a smooth black card or glass with the emulsion and visually observing its appearance. The rating of 1–10 is given, with 1 being the complete absence of any solid particles, and 10 being the presence of a large amount of solid particles resembling rough sandpaper.

The following examples are illustrative of our invention:

EXAMPLE 1

900 grams of conventional low density polyethylene, melt index=7.0, density=0.9191, was placed in a 2-liter resin flask filled with a sweep anchor type stirrer. The flask was heated by means of an electric mantle and the temperature measured with a thermocouple placed in a thermowell immersed in the polymer melt. The flask was purged with nitrogen previous to heating and a nitrogen purge maintained throughout the degradation. The polymer was heated while stirring to 390° C. and held for 20 minutes at this temperature. The polymer was cooled to approximately 300° C. and vacuum applied to strip any low boiling materials from the wax. After the wax had cooled under nitrogen, it was removed and granulated. A white and very hard material was obtained. The following properties were determined:

Viscosity (125° C.)=1950 cps.
Softening point (R. & B.)=110° C.
Penetration=1.5
Total unsaturation=0.82% C=C

EXAMPLE 2

A 1-liter autoclave was charged with 300 grams of thermally degraded polymer of Example 1 and 2% catalyst—nickel on kieselghur. The autoclave was heated to 180° C. and pressured to 200 p.s.i.g. with hydrogen. Agitation at reaction conditions was continued for 4 hours at which time the hydrogen was vented and the polymer filtered free of the catalyst. The resultant white hard polymer had the following properties:

Viscosity (125° C.)=2100 cps.
Softening point=111° C.
Penetration=1.4
Percent unsaturation=<0.03

EXAMPLE 3

Example 2 was repeated using the thermally degraded polymer of Example 1 but 0.1% catalyst and 300° C. hydrogenation temperature. The resultant product after filtration had the following properties:

Viscosity (125° C.)=2150
Softening point=111° C.
Penetration=1.4
Percent unsaturation=0.04

EXAMPLE 4

A 500-ml., 3-neck round-bottom flask was equipped with a stirrer, an inlet tube extending to the bottom of the flask, and an exit for the off-gas. The flask was charged with 250 g. of degraded and hydrogenated material (viscosity at 125° C.=2100 cps., percent unsaturation=0.03 from Example 2) and the flask placed in an oil bath at 150° C. After the wax had become molten the stirrer was started and oxygen flow was begun through the inlet tube at a rate of approximately 1 liter per minute and the stirrer at 700 r.p.m. Samples of the wax were removed periodically and the progress of the oxidation followed by determining the acid number. When the acid number had reached approximately 14–16 the oxidation was stopped and the wax was poured into a pan and allowed to cool. After an oxidation time of 5 hours the wax had the following properties:

Viscosity (125° C.)=910 cps.
Acid number=14.6
Grit=1–2 (Excellent)
Emulsion=Excellent
Softening point=106.7
Penetration=2.1
Density=0.9449
Color=1–

The melt viscosity and color stability was determined at 125° C. and is given below.

|  | Days at 125° C. | | | |
| --- | --- | --- | --- | --- |
|  | 0 | 1 | 2 | 3 |
| Viscosity (125° C.) | 910 | 1160 | 1960 | 3300 |
| Color | 1– | 2 | 4 | 5 |

The material after 3 days of heating had a 12.4 acid number and yielded an excellent emulsion.

EXAMPLE 5

Example 1 was repeated using a 1.7 melt index, density=0.92 high-pressure polyethylene. The contact time at 390° C. was 3 hours yielding a white, hard solid having the following properties:

Viscosity=405 cps.
Softening point=104.2
Penetration=2.6
Total unsaturation=0.87%

EXAMPLE 6

The degraded solid of Example 5 was hydrogenated with 0.5% by weight of a catalyst (50% nickel on kieselguhr) at 250° C. for 4 hours yielding a polymer having the following properties:

Viscosity (125° C.)=465 cps.
Softening point=106
Penetration=2.0
Total unsaturation=0.03%

EXAMPLE 7

Example 4 was repeated using the degraded and hydrogenated material of Example 6 having a viscosity of 465 cps. The oxidation took 4½ hours at 150° C. and yielded an emulsifiable wax having the following properties:

Viscosity (125° C.)=300 cps.
Acid number=13.5
Emulsion=Excellent
Grit=2
Softening point=105.2
Penetration=3.0
Density=0.9410
Color=1−

The melt viscosity and color stability was determined at 125° C.

|  | Days at 125° C. | | | |
| --- | --- | --- | --- | --- |
|  | 0 | 1 | 2 | 3 |
| Viscosity (125° C.) | 270 | 330 | 410 | 515 |
| Color | 1− | 2−3 | 4−5 | 6 |

The material after 3 days of heating had a 11.9 acid number and yielded an excellent emulsion.

EXAMPLE 8

Example 1 was repeated using a high-pressure polyethylene having a 7.0 melt index and a density of 0.9191. The contact time at 390° C. was 3½ hours yielding a white, hard polymer having the following properties:

Viscosity (125° C.)=220 cps.
Softening point=102° C.
Penetration=3.0
Total unsaturation=1.15%

EXAMPLE 9

The degraded solid of Example 8 was hydrogenated with 0.5% palladium on alumina, 2.0% total weight catalyst at 300° C. for 3 hours yielding a polymer having the following properties:

Viscosity (125° C.)=260 cps.
Softening point=104° C.
Penetration=2.2
Total unsaturation=0.02%

EXAMPLE 10

Example 4 was repeated using the degraded and hydrogenated material of Example 9 having a viscosity of 260 cps. at 125° C. The oxidation took 4 hours and yielded an emulsifiable wax having the following properties:

Viscosity (125° C.)=190 cps.
Acid number=13.2
Emulsion=Excellent
Grit=1−2
Softening point=103.4
Penetration=3.6
Density=0.9407
Color=1−

The melt viscosity and color stability at 125° C. were:

|  | Days at 125° C. | | | |
| --- | --- | --- | --- | --- |
|  | 0 | 1 | 2 | 3 |
| Viscosity, cps., 125° C. | 190 | 190 | 210 | 220 |
| Color | 1− | 2 | 4 | 5 |

The material after 3 days heating had an acid number of 12.3 and yielded an excellent emulsion.

EXAMPLE 11

Example 1 was repeated using a medium density polyethylene having a melt index=1.7 and a density of 0.9372. The contact time at 390° C. was 3¼ hours yielding a white, hard solid having the following properties:

Viscosity (125° C.)=430 cps.
Softening point=112° C.
Penetration=1.1
Total unsaturation=0.74%

EXAMPLE 12

The degraded solid of Example 10 was hydrogenated with 0.5% by weight of catalyst (50% nickel on kieselguhr) at 250° C. for 4 hours yielding a polymer having the following properties:

Viscosity (125° C.)=490
Softening point=114° C.
Penetration=0.9
Total unsaturation=0.04

EXAMPLE 13

Example 4 was repeated using the degraded and hydrogenated material of Example 11 having a viscosity of 490 cps. at 125° C.

The oxidation took 4½ hours and yielded an emulsifiable wax having the following properties:

Viscosity (125° C.)=275 cps.
Acid number=14.5
Softening point=108.0
Penetration=1.0
Emulsion=Excellent
Grit=1−2
Density=0.9528
Color=1−

The melt viscosity and color stability at 125° C. were:

|  | Days at 125° C. | | | |
| --- | --- | --- | --- | --- |
|  | 0 | 1 | 2 | 3 |
| Viscosity, 125° C. | 275 | 300 | 355 | 430 |
| Color | 1− | 2 | 3 | 4 |

The material after 3 days heating had an acid number of 12.9 and yielded an excellent emulsion.

EXAMPLE 14

Example 1 was repeated using a low-pressure high-density polyethylene, melt index=8.0, density=0.9740. The contact time at 400° C. was 2 hours yielding a white, hard solid having the following properties:

Viscosity (150° C.)=360 cps.
Softening point=117.6
Penetration=1.3
Total unsaturation=0.81

EXAMPLE 15

The degraded material of Example 13 was hydrogenated using 0.5% by weight of catalyst (50% nickel on kieselguhr) at a temperature of 250° C. for 4 hours yielding a polymer having the following properties:

Viscosity (150° C.)=405 cps.
Softening point=119° C.
Penetration=0.9
Total unsaturation=0.05

EXAMPLE 16

Example 4 was repeated using the degraded and hydrogenated material of Example 14. The oxidation took 5½ hours and yielded an emulsifiable wax having the following properties:

Viscosity (150° C.)=260 cps.
Acid number=15.2
Emulsion=Excellent
Grit=1–2
Softening point=116.2° C.
Penetration=1.2
Color=1–

The melt viscosity and color stability at 150°

|  | Days at 150° C. | | | |
|---|---|---|---|---|
|  | 0 | 1 | 2 | 3 |
| Viscosity, cps., 150° C | 260 | 300 | 380 | 420 |
| Color | 1– | 2 | 2–3 | 4 |

The material after 3 days of heating had an acid number of 13.4 and yielded a good emulsion.

EXAMPLE 17

Polyethylene was thermally degraded and hydrogenated to form a feed material having the following properties:

Viscosity (125° C.)=2200 cps.
Softening point=108
Penetration=1.5
Total unsaturation=0.08%

The feed material was oxidized with air at 80 p.s.i.g. and 150° C. in a continuous oxidizer.

The emulsifier wax obtained was in the form of white pellets having low odor and the following average properties:

Viscosity (125° C.)=1240 cps.
Acid number=14.2
Emulsion=Excellent
Grit=1–2
Softening point=106.5
Penetration=1.9
Density=0.9441
Color=1–

The melt viscosity and color stability at 125° C. were:

|  | Days at 125° C. | | | |
|---|---|---|---|---|
|  | 0 | 1 | 2 | 3 |
| Viscosity (125° C.) | 1,240 | 1,840 | 3,550 | 9,400 |
| Color | 1 | 1 | 2 | 3–4 |

The material after heating 3 days had an acid number of 10.9 and was emulsifiable.

The novel emulsifiable waxes that can be produced in accordance with our invention possess exceptional viscosity and color stability in the melt and they also possess excellent initial color. The waxes also contain very low quantities of odor bodies and they can be used to form excellent aqueous emulsions containing substantially no emulsified particles. These waxes are substantially completely emulsifiable.

With our waxes it is possible to obtain varying degrees of melt and color stability depending upon the percent unsaturation remaining in the degraded wax before oxidation. Prior to our invention it was known that emulsifiable waxes could be produced by thermally degrading a polyolefin such as polyethylene and then oxidizing the degraded products. However, an emulsifiable wax could not be produced by merely oxidizing an undegraded polyolefin, such as polyethylene. Our product overcomes many of the shortcomings of the prior art emulsifiable waxes, particularly insofar as melt and color stability are concerned. FIGS. 1 and 2 illustrate the importance of reducing the degree of unsaturation of the thermally degraded polymer prior to oxidation in order to improve the melt and color stability of our waxes. FIG. 1 is a graphic representation showing the relationship of the heat stability of the oxidized thermally degraded polyethylene as a function of the present unsaturation. FIG. 2 is a graphic representation showing the relationship of the color stability of oxidized thermally degraded polyethylene as a function of the percent unsaturation. Each of the curves in FIGS. 1 and 2 represents an emulsifiable wax made from thermally degraded polyethylene having a different degree of unsaturation. The stabilities are shown for the oxidized product and the unsaturation values refer to the percent C=C in the feed material for the oxidation reaction. The greater the slope of the individual curves, the poorer the stability of the oxidized product.

Degraded polyethylene of 2,000 cps. viscosity usually contains about 0.7–0.9% total unsaturation and the top line in each of FIGS. 1 and 2 represents a thermally degraded unhydrogenated oxidized material. The color stability of the wax can be improved by reducing the percent unsaturation to about 0.2–0.3% and the viscosity stability can be improved by a similar reduction in unsaturation. However, in order to obtain superior stability the percent unsaturation should be reduced to 0.1%.

The improved physical properties of our emulsifiable waxes are important for a number of reasons, particularly in commercial operation. In commercial production of emulsions prolonged heating of the emulsion may sometimes be necessary. However, in emulsions prepared from our waxes the prolonged heating does not increase the color or viscosity of the emulsion to a point where handling of the emulsion becomes a problem. Also, the low odor of our waxes permits their use in applications where heretofore emulsifiable polyethylene waxes could not be used. The emulsions formed from our novel waxes are especially free of unemulsified particles and this advantage eliminates filtration problems that have often been encountered in the past with the prior art types of emulsifiable waxes.

Our novel waxes also offer important advantages from the production standpoint. Since viscosity increase of our waxes is very low after prolonged heating the processing lines, oxidizers, and other equipment remain exceptionally clean and free from scale deposits. As a consequence, maintenance costs are reduced considerably and contamination of the wax from scale flaking off the equipment is minimized. Since the waxes do not tend to discolor upon prolonged storage costly reclaiming procedures are eliminated. Additionally, the oxidation reaction used to form our novel waxes is relatively easy to control in plant operation since slight changes in temperature do not affect the acid number of the product. This factor makes it possible to produce a highly uniform product.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method for producing a color and viscosity stable product from a high molecular weight polyhydrocarbon which comprises thermally degrading said polyhydrocarbon to form an unsaturated, lower molecular weight product, hydrogenating said product to reduce substantially the unsaturation thereof, and oxidizing hydrogenation product to a substantial acid number.

2. The method for producing a color and viscosity stable product from a high molecular weight polyethylene which comprises thermally degrading said polyethylene to form an unsaturated, lower molecular weight product, hydrogenating said product to reduce substantially the unsaturation thereof, and oxidizing hydrogenation product to a substantial acid number.

3. The method for producing an emulsifiable wax of improved color and viscosity stability which comprises thermally degrading solid, high molecular weight polyethylene to form a solid, unemulsifiable, highly unsaturated wax having a molecular weight below about 5000, hydrogenating said unsaturated wax to reduce substantially the unsaturation thereof, and oxidizing hydrogenation product to form an emulsifiable wax.

4. The method for producing an emulsifiable wax of improved color and viscosity stability which comprises thermally degrading polyethylene having a molecular weight within the range of 10,000 to 50,000 to form a solid, unemulsifiable, highly unsaturated wax having a molecular weight below about 5,000, hydrogenating said unsaturated wax in the presence of a hydrogenation catalyst to reduce substantially the unsaturation thereof and oxidizing hydrogenation product with air at a temperature within the range of 100 to 225° C. to form an emulsifiable wax.

5. The method for producing a completely emulsifiable wax of improved color and viscosity stability which comprises heating polyethylene produced by a high-pressure process at a temperature within the range of 200 to 400° C. to form a solid, unemulsifiable, highly unsaturated wax having a molecular weight below about 5,000 said polyethylene prior to heating having a molecular weight within the range of 10,000 to 50,000, by hydrogenating said unsaturated wax by contact with hydrogen in the presence of a hydrogenation catalyst at a temperature within the range of 100 to 400° C. to reduce substantially the unsaturation of said unsaturated wax and oxidizing hydrogenation product by contact with air at a temperature within the range of 100 to 225° C. to form a completely emulsifiable wax having an acid number within the range of 4–30.

6. The method for producing a completely emulsifiable wax of improved color and viscosity stability which comprises heating polyethylene produced by a high-pressure process in an inert atmosphere at a temperature within the range of 200–400° C. for a period of time not exceeding 10 hours to form a solid, unemulsifiable, highly unsaturated wax having a molecular weight below about 5,000, hydrogenating said unsaturated wax by contact with hydrogen in the presence of a palladium hydrogenation catalyst at a temperature within the range of 100 to 400° C. and a pressure within the range of atmospheric to 6,000 p.s.i.g. to reduce the unsaturation of said unsaturated wax to not more than 0.1% and oxidizing hydrogenated product by contacting with air at a temperature within the range of 100 to 225° C. and a pressure within the range of atmospheric to 1,000 p.s.i. for a period of time within the range of ½ to 8 hours to form a completely emulsifiable wax having an acid number within the range of 4–30.

7. The method for producing a completely emulsifiable wax of improved color and viscosity stability which comprises heating polyethylene produced by a low-pressure process in an inert atmosphere at a temperature within the range of 200–400° C. for a period of time not exceeding 10 hours to form a solid, unemulsifiable, highly unsaturated wax having a molecular weight below about 5,000, hydrogenating said unsaturated wax by contact with hydrogen in the presence of a palladium hydrogenation catalyst at a temperature within the range of 100 to 400° C. and a pressure within the range of atmospheric to 6,000 p.s.i.g. to reduce the unsaturation of said unsaturated wax to not more than 0.1% and oxidizing hydrogenated product by contacting with air at a temperature within the range of 100 to 225° C. and a pressure within the range of atmospheric to 1,000 p.s.i. for a period of time within the range of ½ to 8 hours to form a completely emulsifiable wax having an acid number within the range of 4–30.

8. As a composition of matter, a product prepared according to the process of claim 1.

9. As a composition of matter, a product prepared according to the process of claim 6.

10. As a composition of matter, a product prepared according to the process of claim 7.

11. As a composition of matter, an aqueous emulsion containing a completely emulsifiable wax prepared according to the process of claim 6.

12. As a composition of matter, an aqueous emulsion containing a completely emulsifiable wax prepared according to the process of claim 7.

13. A process for the production of waxes emulsifiable in aqueous media by the oxidation of thermally degraded polyolefins which comprises: hydrogenating said thermally degraded polyolefins to saturate a sufficient number of double bonds of said material to produce a product having a bromine number of not more than one, and thereafter oxidizing said hydrogenated polyolefins until the product has an acid number between 4 and 80.

14. A process for the production of waxes emulsifiable in aqueous media by oxidation of thermally degraded polyolefins having a molecular weight between 1000 and 15,000 which comprises: hydrogenating said thermally degraded polyolefins to saturate a sufficient number of double bonds of said material to produce a product having a bromine number of not more than one, and thereafter oxidizing said hydrogenated polyolefins until the product has an acid number between 4 and 80.

15. A process for the production of waxes emulsifiable in aqueous media by oxidation of thermally degraded polyolefins having a molecular weight between 3000 and 10,000 which comprises: hydrogenating said thermally degraded polyolefins to saturate a sufficient number of double bonds of said material to produce a product having a bromine number of not more than one, and thereafter oxidizing said hydrogenated polyolefins until the product has an acid number between 4 and 80.

16. A process for the production of waxes emulsifiable in aqueous media by oxidation of thermally degraded polyethylene having a molecular weight between 3000 and 10,000 which comprises: hydrogenating said thermally degraded polyolefins to saturate a sufficient number of double bonds of said material to produce a product having a bromine number of not more than one, and thereafter oxidizing said hydrogenated polyolefins until the product has an acid number between 4 and 80.

17. A process for the production of waxes emulsifiable in aqueous media by oxidation of thermally degraded polypropylene having a molecular weight of between 3000 and 10,000 which comprises: hydrogenating said thermally degraded polyolefins to saturate a sufficient number of double bonds of said material to produce a product having a bromine number of not more than one, and thereafter oxidizing said hydrogenated polyolefins until the product has an acid number between 4 and 80.

18. A process for the production of waxes emulsifiable in aqueous media by oxidation of thermally degraded polyolefins which comprises: hydrogenating said thermally degraded polyolefins with a fixed bed catalyst to saturate a sufficient number of double bonds of said material to produce a product having a bromine number of not more than one, and thereafter oxidizing said hydrogenated polyolefins until the product has an acid number between 4 and 80.

References Cited

UNITED STATES PATENTS 3,285,902   11/1966   Schmeidl et al. _____ 260—94.9

FOREIGN PATENTS 1,252,635   12/1960   France.

JOSEPH L. SCHOFER, Primary Examiner

J. C. HAIGHT, Assistant Examiner

U.S. Cl. X.R.

260—93.7, 94.9, 96

PO-1050
(5/69)

UNITED STATES PATENT OFFICE
CERTIFICATE OF CORRECTION

Patent No. 3,519,588     Dated July 7, 1970

Inventor(s) Hugh J. Hagemeyer, Jr. and Raymond L. Etter, Jr.

It is certified that error appears in the above-identified patent and that said Letters Patent are hereby corrected as shown below:

Column 11, line 34, "emulsifier" should read ---emulsifiable---. Column 11, line 52, the first "1" should read --- 1- ---.

SIGNED AND SEALED
OCT 13 1970

(SEAL)
Attest:

Edward M. Fletcher, Jr.
Attesting Officer

WILLIAM E. SCHUYLER, JR.
Commissioner of Patents